United States Patent [19]
Becker

[11] Patent Number: 4,504,775
[45] Date of Patent: Mar. 12, 1985

[54] SELF OSCILLATING, SINGLE-ENDED FLYBACK CONVERTER WITH INPUT VOLTAGE RESPONSIVE CONTROL

[76] Inventor: Klaus Becker, Kapellenweg 38, Strullendorf, Fed. Rep. of Germany, D-8602

[21] Appl. No.: 287,720
[22] PCT Filed: Nov. 29, 1980
[86] PCT No.: PCT/DE80/00176
  § 371 Date: Jul. 24, 1981
  § 102(e) Date: Jul. 24, 1981
[87] PCT Pub. No.: WO81/01634
  PCT Pub. Date: Jun. 11, 1981

[30] Foreign Application Priority Data
Nov. 29, 1979 [DE] Fed. Rep. of Germany ....... 2948054
Oct. 30, 1980 [DE] Fed. Rep. of Germany ....... 3040875

[51] Int. Cl.[3] .............................................. H02J 7/10
[52] U.S. Cl. ......................................... 320/32; 363/19; 363/142
[58] Field of Search ................. 363/19, 21, 142; 331/112; 320/2, 3, 32, 39

[56] References Cited

U.S. PATENT DOCUMENTS
3,435,320  3/1969  Lee et al. ........................... 363/19
4,220,905  9/1980  Quarton ............................. 320/39

FOREIGN PATENT DOCUMENTS
1152295  5/1969  United Kingdom .................. 363/19

OTHER PUBLICATIONS
Zuider, "Fast-Charging Systems for Ni-Cd Batteries," EDN, vol. 15, No. 2, pp. 65-67, Jan. 15, 1970.

Primary Examiner—William H. Beha, Jr.
Attorney, Agent, or Firm—Gifford, VanOphem, Sheridan, Sprinkle & Nabozny

[57] ABSTRACT

A circuit arrangement for the controlled supply of loads, in particular portable devices, for example dry razors and electronic flash devices, or also fluorescent lamps or the like, on virtually any d.c. and a.c. systems of different frequencies and voltages, without switching over. For that purpose, the arrangement uses a blocking converter (5) which is controlled by means of two controllable semiconductor switches (T1, T2) in dependence on the current (I1) flowing through the primary winding (n1) of the converter (5) and in dependence on the input voltage (U1) of the supply, in such a way that the output power supplied follows a desired characteristic curve and in particular is constant. If the load to be supplied is an accumulator (2) with a motor (1) connected in parallel, the circuit arrangement can supply either the full motor power or, when the motor is switched off, a charging current for the accumulator (2). Additional control of the circuit arrangement is possible, in dependence on the load current, so that for example a motor can be adjusted in dependence on loading. When the arrangement supplies a fluorescent lamp, the light flux can be controlled.

8 Claims, 9 Drawing Figures

SELF OSCILLATING, SINGLE-ENDED FLYBACK CONVERTER WITH INPUT VOLTAGE RESPONSIVE CONTROL

BACKGROUND OF THE INVENTION

I. Field of the Invention

The invention relates to a circuit arrangement for the controlled supply of a load, as set forth in the classifying portion of claim 1.

II. Description of the Prior Art

For many electrical loads, for example portable devices, which include electric dry razors, electronic flash devices, fluorescent lamps and the like, it is desirable to provide a power supply circuit which can be operated without change-over switching from virtually all d.c. and a.c. mains anywhere in the world, and which supplies power to the load in the required manner, for example at a constant current or a constant voltage or a combination of both. If the load includes a battery or accumulator, so that for example in the case of a dry razor, the device can also be operated independently of the main supply, the power supply circuit should in turn be capable of charging up the battery, independently of the main supply voltage and frequency, or should be capable of feeding power to the load alone, for example when the battery is discharged.

In connection with the above-described situations of use of such a circuit arrangement, a further condition which gives rise to complications is that, because of the restricted amount of space, for example in a dry razor, the space required for accommodating a supply circuit arrangement can only be very small and at the same time the power loss must be kept at a particularly low level because the cooling capabilities are greatly restricted when dealing with a small volume. Finally, there is a requirement in respect of many portable devices for the device to operate satisfactorily, even under high ambient temperature conditions, for example on travelling to tropical countries.

In a known circuit arrangement (U.S. Pat. No. 4,005,351), the input voltage has a strong influence on the mode of operation because the speed of rise of the primary current depends on the input voltage. The period of time for which the first semiconductor switch in the form of a transistor is switched on is then reduced, with the same switch-off current, as the input voltage rises, and the resulting change in frequency leads to a corresponding change in the mean output power. Although, for the purposes of maintaining the output voltage at a constant value, the known circuit arrangement provides for influencing the primary current switch-off value and thus the period of time for which the switch is switched on, by applying a further voltage which is obtained during the non-conducting phase and which is applied to the control electrode of the second semiconductor switch, nonetheless that arrangement does not overcome the basic dependency on the input voltage. As the two control parameters, namely the primary current and the output voltage, are produced at different times, during the conduction and the non-conduction or blocking phases respectively, it is necessary to provide for storage of one value by means of a capacitor. This results in a reduction in the speed of control, and the circuit arrangement cannot therefore adjust immediately to fluctuations in the operating conditions.

A further circuit arrangement is also known [DOS (German laid-open application) No. 27 51 578], for producing a controlled voltage, using a blocking converter or transformer whose primary winding is connected to the input voltage source by way of a transistor which can be switched on by positive feedback, and an emitter resistor. As in the case of the circuit arrangement described hereinbefore, this circuit arrangement also has a severe dependency on the input voltage, which is due to the different speed of rise of the primary current, in dependence on the input voltage. In this case also, control in respect of the output voltage is achieved by producing a voltage during the non-conduction or blocking phase so that a storage capacitor is again required.

A feedback-controlled single-cycle blocking converter is also known [DOS (German laid-open application) No. 25 43 371], in which the associated transformer is respectively put into a condition of saturation, and then produces the switching-off effect. Besides the primary winding, the converter arrangement also has a secondary winding which is used at the same time for deriving the feedback voltage. That also applies in regard to a known push-pull d.c. voltage transformer [DAS (German published application) No. 12 30 119], in which control of the primary switches is effected by means of a voltage which is derived from the secondary winding.

In another known circuit arrangement (British published specification No. 20 00 394A) for supplying a d.c. motor and charging a battery or accumulator, the circuit arrangement, for example for an electric razor, the arrangement uses a blocking converter which is connected to the respective main voltage by way of a bridge rectifier and which supplies at the secondary side, depending on the condition of operation, the charging current for the accumulator or the operating current for the motor. The control action, for compensating for the varying input voltages, is produced by means of a complicated control circuit in the form of an integrated circuit which supplies switching pulses to the primary-side switching transistor of the blocking converter, the length of said pulses depending on the input voltage and the respective mode of operation of the arrangement. However, the known circuit arrangement does not fulfill all expectations. The cost thereof is comparatively high and the amount of space that it occupies is frequently excessively large. The integrated circuit requires its own supply voltage and accordingly a starting circuit for the converter. It also consumes power. When operating the motor from the mains, it is not possible to achieve or maintain a full charge in the battery.

A transistor converter circuit is also known [DOS (German laid-open application) No. 20 14 377], by means of which on the one hand a charging current for charging a battery and on the other hand a higher direct current for driving a motor can be produced from a main a.c. voltage. For this purpose, the arrangement has a through-flow converter which is operated at high frequency and has a saturable core, being connected at the primary side to the rectified main voltage and supplying the desired currents at the secondary side. The known circuit can only be operated on a given main voltage, and therefore does not automatically adapt to different voltages. As the core of the transformer goes into a condition of saturation in each case, the level of efficiency is low, and problems arise in regard to heat.

For operating a motor-driven electric razor over a wide range of a.c. input voltages, a circuit is known (U.S. Pat. No. 4,001,668), in which a capacitor is charged up by way of transistors to a predetermined value of about 100 V. This circuit is not suitable for producing higher currents because there is no transformation action. It is also only suitable for loads which have a comparatively high operating voltage. With lower levels of operating voltage, the degree of efficiency deteriorates seriously. The amount of space occupied by the arrangement is comparatively large.

Finally, a charging device for accumulators or batteries is also known (U.S. Pat. No. 3,943,423), which can be used, without switching over, for different input voltages. A transistor switch is disposed in a feedback circuit and represents a variable resistor which takes over the current control function. There is no transformation effect in this arrangement, so that higher currents cannot be produced.

SUMMARY OF THE PRESENT INVENTION

The present invention is based on the problem of providing a circuit arrangement which can be operated without switching over, on a very wide range of input voltages, for example in a range of 1:3, with a high degree of efficiency and a high control speed, with the circuitry expenditure and the amount of components and space remaining at a minimum.

Switching off of the primary current is produced not just by the first control signal which is proportional to the linearly rising inductive primary current, but in addition by a second control signal which is proportional to the input voltage. In this way the mean energy content of the transformer core and thus the output power can be influenced or maintained constant in a very simple manner, more particularly over a very wide range of input voltages between for example 90 and 270 V. There is no need to store control parameters so that the components for such a purpose are omitted.

There is also no need for an integrated circuit as the control circuit, which requires its own power supply and its own oscillator for clock control purposes.

If the load, for example an electric dry razor, includes a battery or accumulator, then, for the purposes of producing a constant output current which charges up the battery and/or feeds the motor, the period of time for which the semiconductor switch is switched off can be properly influenced, in very simple manner, by the secondary winding supplying a current to the battery only for so long as the voltage thereof is higher than the substantially constant voltage at the terminals of the battery. If a constant voltage at the load is to be achieved, one of the known voltage control circuits which act on the semiconductor switch can be employed for that purpose. In a similar manner, it is also possible to achieve a combination of a predetermined output voltage with a predetermined output current, for a wide range of input voltages.

As the arrangement ensures that the core of the converter does not go into a condition of saturation, that is to say, the semiconductor switch first switches off the current flowing through the primary winding, the transformer losses remain at a low level. Only very low losses occur in the other components of the circuit arrangement so that the overall degree of efficiency is high. The rise in temperature of the circuit remains within low limits in that case so that the circuit can be disposed in a very close space, without the need for special cooling.

Thus, a resistor may be connected in series with the primary winding of the transformer, a current which is proportional to the voltage of the input voltage source may be superimposed on the primary current flowing through the first resistor, and the voltage drop at the first resistor may be applied as first and second control signals to the control electrode of the second semiconductor switch. The first and the second control signals can be derived in a particularly simple fashion in this way, and added by the superimposition of two currents, wherein the voltage drop across the resistor reaches the critical value which causes switching off of the primary current, with rising input voltage, at an earlier time, and this means that the mean energy content of the transformer core is in turn adjusted.

The current component corresponding to the voltage of the input voltage source can be derived directly from the input voltage source. In a development of the present invention however, in order to reduce the power loss, the above-mentioned current component is supplied by way of a second resistor which is connected to the secondary winding of the transformer. During the phase in which the semiconductor switch is switched on, there is in fact applied to the secondary winding, a voltage which is equal to a fraction of the input voltage, corresponding to the windings ratio. In addition, a display means, for example a light emitting diode, may be connected in series with the second resistor, the display means then displaying the mode of operation with an equal level of light intensity, at all input voltages.

It may also be provided that the first resistor is replaced by two series-connected resistors, that the voltage drop at the junction of the two resistors is applied by way of a third resistor to the control electrode of the second semiconductor switch, and the second resistor is connected between the secondary winding and the control electrode of the second semiconductor switch. This arrangement not only causes the first semiconductor switch to be switched off more quickly and thus more reliably and with a lower level of losses, but in addition, the second resistor can be made substantially larger so that the losses occurring therein are reduced.

For the purposes of setting the respective power desired at the load, an alternative embodiment of the invention provides that the first and second resistors are variable. For example, when the load comprises a battery and a motor provided with a switch for switching it on, it is advantageously possible for a further switch to be coupled to the motor switch, said further switch so varying the first and second resistors, when the motor is switched on, that the converter produces alone a current which is sufficient to operate the motor. In this way, for example a motor-driven electric dry razor may be operated from any mains supply, even when the battery is not charged. On the other hand, when the motor is switched off and thus the output of the converter is switched over, the charging current can be set so that the device can be connected to the main supply for any period of time, without damaging the battery.

In accordance with a further proposal according to the invention, a voltage-dependent switch may also be connected to the battery, for switching off the first semiconductor switch when a predetermined battery voltage is attained. This avoids overcharging of the battery so that, even when a high charging current for rapid charging of the battery is used, reliable operation can be achieved. The voltage-dependent switch may be embodied using a transistor, the base-emitter path of which is connected in series with a Zener diode in parallel with the battery, while the collector thereof is connected to the control electrode of the first semiconductor switch. A further possible way of simultaneously monitoring the temperature of a battery or accumulator, in particular a nickel cadmium battery, is for the Zener diode to be thermally coupled to the battery.

If battery operation is not required, then, in accordance with an embodiment of the invention, instead of the battery it is also possible to use a capacitor which provides a constant mean output voltage.

A further embodiment provides that a capacitor is connected downstream of the winding for supplying the load, by way of a rectifier, with the capacitor charging voltage being maintained constant by way of a Zener diode which acts on the control electrode of the first semiconductor switch.

This therefore provides a constant voltage source, the level of voltage of which is determined by the sufficiently close, ordinary voltage tolerances of Zener diodes, and fixed resistors. Optionally however, it would also be possible to use Zener diodes having selected voltages, and resistors with closer tolerances. There is no need for adjustments to achieve the respective correct voltage, taking into account the production tolerances, in particular the widely varying current amplification factors of the transistors which are generally used as semiconductor switches, so that the cost of manufacture is reduced, particularly in regard to small-size devices.

In the simplest case, the Zener diode is connected in series with a resistor between the capacitor and the control terminal of the first semiconductor switch. However, the arrangement may also be such that the Zener diode acts by way of a photocoupler on the control electrode of the first semiconductor switch. It is then possible to provide for mains isolation, that is to say, the load is not galvanically connected to the main supply. For this mains isolation effect, it is additionally necessary for the load current to be supplied by an additional secondary winding of the converter.

If the load comprises, for example in an electric dry razor, a battery and a motor disposed in parallel by way of a switch, an embodiment of the invention provides that the capacitor charging voltage charges up the battery by way of a resistor, that a further switch which is connected in parallel with the resistor is connected to the switch of the motor, for switching over the supply voltage from charging operation to motor operation, and the Zener breakdown voltage of the Zener diode is higher than the battery voltage. As the charging current is supplied by a constant voltage source, it can easily be adjusted to the desired value, by suitable selection of a fixed resistor. When operating the motor from the main supply, the resistor is short-circuited by the parallel-connected switch which is coupled to the motor switch. The voltage is then stabilized directly by the battery at a voltage level which is lower than the constant voltage produced in the charging mode of operation and the level of which is determined by the Zener diode. The converter can then supply its full output power without restriction by the zener diode which is nonconducting because of the lower battery voltage. As both switches are equally loaded by the motor current, this gives equally good contacting. Finally, in motor operation both with a power supply from the mains and also a power supply from the battery, there is the advantage that the comparatively large capacitor which is then in parallel with the motor has an interference suppression effect.

For the purposes of indicating the operating mode, a proposal in accordance with the invention provides that a light emitting diode is connected in series with the resistor. The diode is brightly lit during the charging mode, because the full charging current is available for supplying the diode.

It is frequently desirable or even necessary to provide for control in respect of the voltage applied to the load, or the current flowing. For example, in the case of an incandescent lamp, the cold resistance is so low that under some circumstances the converter may not be able to reach the desired operating condition. If the load is a direct current motor, there is frequently a requirement for the speed of motor rotation to be kept constant, irrespective of the load, or at least for a certain re-adjustment under load. For that purpose, a development of the invention provides that a third control signal which is proportional to the load current is additionally applied to the control electrode of the second semiconductor switch. A first practical embodiment is characterised in that the load is connected on one side to the resistor which is disposed in series with the first semiconductor switch, in such a way that the load current or an equivalent to the load current flows in the opposite direction to the primary current, by way of the resistor. If then the load current rises, for example when the motor is slowed down, the load current which is then higher causes the first semiconductor switch to be switched off at a later time because the voltage required for switching off the semiconductor switch, across the resistor, is reached at a later time. Another practical embodiment provides that the Zener diode is replaced by an equivalent component with a variable Zener breakdown voltage, and that a control signal which is derived from the load current is applied to the component, in order to control the Zener breakdown voltage in dependence on the load current.

Finally, in an embodiment of the invention, the second semiconductor switch may be replaced by a Zener diode which is connected to the control electrode of the first semiconductor switch and to which there is applied the voltage drop at the resistor, such that the Zener diode conducts when the current flowing through the resistor reaches a predetermined value. In this way, the current flowing through the first semiconductor switch and thus the primary winding of the converter can no longer rise so that polarity reversal occurs and the first semiconductor switch is switched off by virtue of the feedback effect. In many cases, the simplification achieved in the circuit by replacing the second semiconductor switch with a Zener diode compensates for the control performance which may be worse under some circumstances.

BRIEF DESCRIPTION OF THE DRAWING

The invention is described hereinafter with reference to the drawings in which.

DETAILED DESCRIPTION OF THE PREFERRED EMBODIMENT

Figure 1:
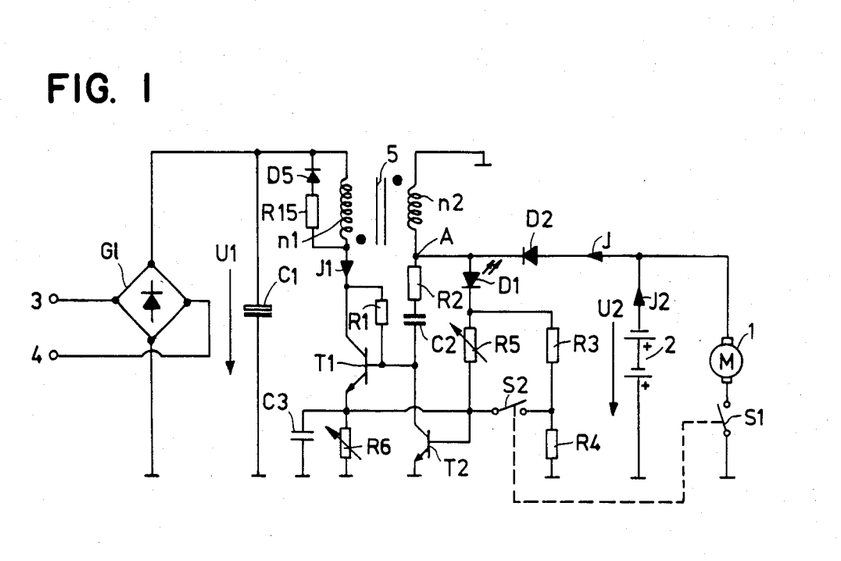
FIG. 1 shows an embodiment of a circuit arrangement according to the invention for use in a motor-driven dry razor with battery.

The circuit arrangement shown in FIG. 1 is intended for installation in an electric dry razor which is provided with a small direct current motor 1 and a nickel-cadmium battery or accumulator 2 comprising a plurality of cells. The motor is switched by way of a control switch S1. The main voltage supply which may be a d.c or a.c voltage is applied to the terminals 3 and 4, rectified by means of a rectifier bridge G1 and smoothed by a capacitor C1. This produces a d.c. voltage U1, the value of which, when using an a.c voltage, is approximately equal to 1.4 times the effective value of the a.c. voltage. For the following description, it is assumed that the circuit arrangement is initially in an electrical condition of rest, and the two transistors acting as semiconductor switches T1 and T2 are in a non-conducting condition.

As soon as the d.c. voltage U1 is applied to the series circuit comprising the primary winding n1 of the transformer 5 which has a ferrite core, the transistor T1 and the resistor R6 thereof, acting as the emitter resistor, a base current can flow by way of the resistor R1 which is connected between the collector and the base of the transistor T1. A base current of a few microamps is sufficient to produce in the transistor T1 a small collector current which flows through the winding n1 of the transformer 5. The change in magnetic flux in the transformer, which results from that flow of current, induces a positive voltage at point A of the secondary winding n2. That positive voltage is applied by way of a resistor R2 and a capacitor C2 to the base of the transistor T1 and produces a larger base current. By virtue of this positive feedback effect, the transistor T1 is rapidly switched on completely, with only a small residual voltage remaining between its emitter and collector. The base current is essentially limited by the resistor R2.

When the transistor T1 is switched on, the current I1 flowing through the winding n1 of the transformer rises linearly until a voltage of about 700 mV which is proportional to the current I1 is applied across the resistor R6, the light emitting diode D1 and the resistors R3, R4, R5 being disregarded for the time being. The above-indicated voltage causes a base current to flow in the transistor T2, whereby the transistor T2 is switched on and pulls the base of the transistor T1 to the reference potential. Because of this, the conductivity of the transistor T1 decreases so that the current I1 flowing through the winding n1 falls. Because of the associated reduction in the magnetic flux in the core of the transformer 5, there is a reversal of polarity of the secondary voltage at point A, which is fed back by way of the resistor R2 and the capacitor C2 so that the transistor T1 is finally switched off entirely. The speed of transistor switch-off is increased by the capacitor C3 in parallel with the resistor R6 as the capacitor C3 temporarily holds the voltage at the emitter of the transistor T1, whereby the base-emitter voltage of the transistor T1 becomes negative at the moment that the transistor is switched off.

During the non-conducting phase of the transistor T1, the magnetic energy stored in the core of the transformer 5 is discharged from the secondary winding n2, in the form of a current. When this occurs, the diode D2 conducts and—with the switch S1 being assumed open— the accumulator 2 receives a linearly falling charging current. A negative falling current through the resistor R2 and the capacitor C2 holds the transistor T1 in a non-conducting condition until the energy stored in the core of the transformer 5 has flowed away. It is only thereafter that a starting current can flow by way of the resistor R1 into the base of the transistor T1 which triggers the above-described switching-on process.

The duration of the non-conducting or blocking phase of the transformer is dependent on the voltage of the battery 2. That voltage, from the point of view of the transformer, is approximately constant. Current can only flow into the battery 2 as long as the following relationship is fulfilled:

$$\left| N \cdot \frac{d\Phi}{dt} + U_D \right| > |U2|$$

In the above relationship:
N = number of turns of the winding n2,
$d\phi/dt$ = variation in magnetic flux versus time,
$U_D$ = voltage drop at the diode D2,
$U_2$ = battery voltage.

If, at the beginning of each non-conducting phase, the energy content of the transformer 5 is always the same, this results in a flow of charging current into the battery 2, which is constant in time average. If however the battery is discharged to a low level or is short-circuited, the non-conducting phase is correspondingly increased in length. This provides for automatic current restriction in the event of trouble, for example when the motor 1 is locked or there is another short circuit.

The above-described circuit provides that the transformer 5 always has the same energy content at the moment of switching off. As indicated above, with a constant battery voltage U2, this means identical, non-conducting periods $t_s$ (FIG. 2) in respect of the transistor T1 and an identical charging current pattern I2 ($t_s$), for each non-conduction cycle, in respect of the battery 2. The rise in the current I1 through the winding n1 is proportional to the amount of the applied voltage U1. As the transistor T1 is switched off in dependence on its emitter current and thus, to a good approximation, its current I1, the circuit adjusts to changes in the supply voltage U1.

Figure 2:
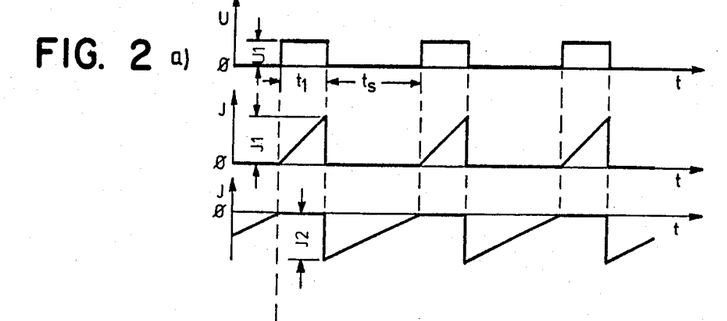
FIG. 2 shows curves indicating the variation in respect of time in voltages and currents at given points in the circuit arrangement shown in FIG. 1.

As shown in FIG. 2, when the input voltage U1 is doubled to the value of 2 U1 (FIG. 2b), the time $t_1$ for which the transistor T1 is switched on is halved. With a constant switch-off time $t_s$, this results in an increase in the switching frequency and thus an increase in the effective accumulator charging current I2.

Added to this is the fact that the transformed voltage at point A (FIG. 1) is proportional to the input voltage U1. With a rising input voltage therefore, the base current of the transistor T1 is increased. The transistor T2 then has to consume a higher current in order to reduce the base voltage of the transistor T1, for the purposes of producing the switching-off action. The consequence is that the time average of the charging current I2 is thereby varied with the input voltage U1. By using a thyristor instead of the transistor T2, it would in fact be possible to reduce that dependency, but it could not be eliminated.

Both influences in respect of the input voltage U1 on the charging current I2, namely the variation in the mean charging current due to a change in frequency of the converter and displacement of the current threshold of the transistor T1 are compensated by a current which is directly proportional to the input voltage U1 being superimposed on the current I1 flowing through the emitter resistor R6. This results in displacement in respect of time of the moment at which the transistor T1 is switched off, by means of the transistor T2, in dependence on the input voltage U1. FIG. 2c shows that, in contrast to the situation shown in FIG. 2b, without compensation, when the input voltage is doubled to the value 2 U1, the transistor T1 is switched off at a lower peak value of the current I1, at which the current triggering the switching-off effect, through the resistor R6, still additionally includes a current component which is proportional to the input voltage U1. In this way the energy content of the transformer is also lower.

The current component which is proportional to the input voltage U1 could be produced by a resistor (not shown) which is disposed between the emitter of the transistor T1 and the voltage U1 at the upper end of the winding n1. However, such a resistor would cause a high level of power loss. During the phase in which the transistor T1 is switched on, that is to say, during the current and voltage rise at the resistor R6, point A is at a potential which is proportional to the input voltage U1. The converter operates in this respect as a normal transformer. Accordingly, because of the substantially lower voltage at the point A, the resistor R5 which is connected to the junction A supplies the desired current component for the resistor R6, which is proportional to the input voltage U1, in a particularly low-loss manner. If the ratio between the resistors R5 and R6 is set at the proper value, it is possible to adjust a charging current I2 for the battery 2, which is independent of the input voltage U1, over wide ranges.

A light emitting diode D1 for indicating the operating mode is connected in series with the resistor R5. By virtue of its blocking action, the diode carries a current only during the phase in which the transistor T1 is switched on. As the period of time for which the transistor is switched on is approximately inversely proportional to the value of the input voltage U1, brightness control in respect of the light emitting diode occurs automatically. In addition, the light emitting diode separates the resistor R5 and the resistors R3 and R4 which are to be described hereinafter, from point A, during the non-conducting phase. This therefore avoids losses.

In the embodiment illustrated, the circuit arrangement is used in an electric razor which is operated with a direct current motor 1. When the switch S1 is open, the circuit operates in the permanent or trickle charge mode. The motor 1 is stationary, the permanent or trickle charge current flows and the light emitting diode D1 is lit. If the switch S1 and therewith also the mechanically coupled switch S2 are closed, the current produced by the transformer 5 is increased approximately tenfold because the resistor R3 is connected in parallel with the resistor R5 and the resistor R4 is connected in parallel with the resistor R6. The motor 1 then runs, without discharging the battery 2 which now only acts as a voltage stabiliser, and the light emitting diode D1 is lit.

Figure 3:
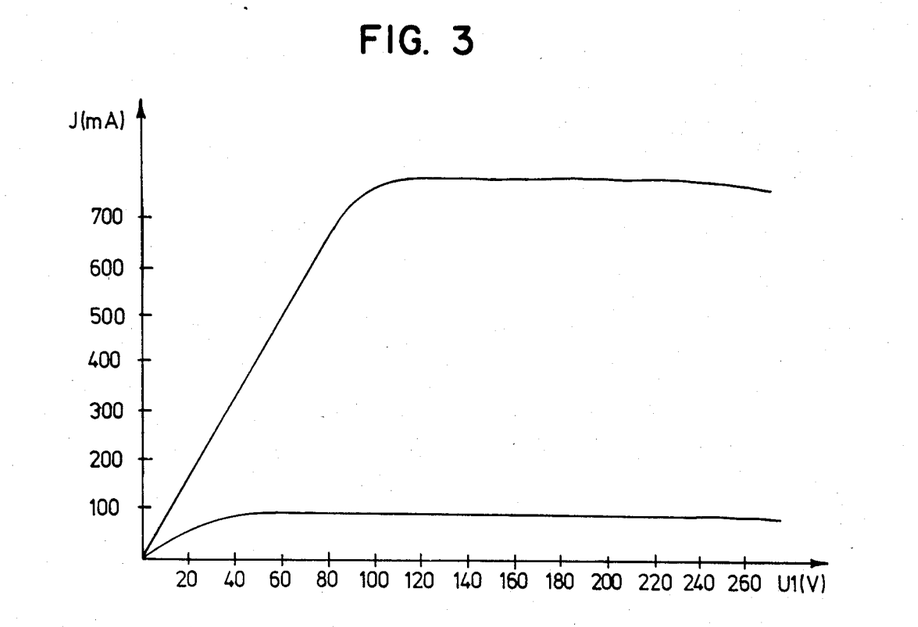
FIG. 3 shows a diagram in respect of the output currents supplied, in dependence on the input voltage.

FIG. 3 shows the dependency of the converter output current I in dependence on the input voltage U1 for the charging mode and for the motor mode. It will be seen that in both modes, the input voltage U1 can fluctuate in the range of between about 90 and 270 V, without substantially affecting the motor current or the charging current.

It should also be added that the capacitor C2 produces a direct current separation or isolation effect. The value of the resistor R1 is several powers of ten higher than that of the resistor R2. Without the direct current separation effect which prevents the current supplied through the resistor R1 flowing away across the resistor R2, the value of the resistor R1 would have to be selected at a substantially lower level, thereby resulting in increased losses.

The series circuit comprising the diode D5 and the resistor R15, which is disposed in parallel with the primary winding n1, provides for an increase in the length of the non-conducting phase, particularly in the charging mode, that is to say, when producing a low level of output power.

Figure 4:
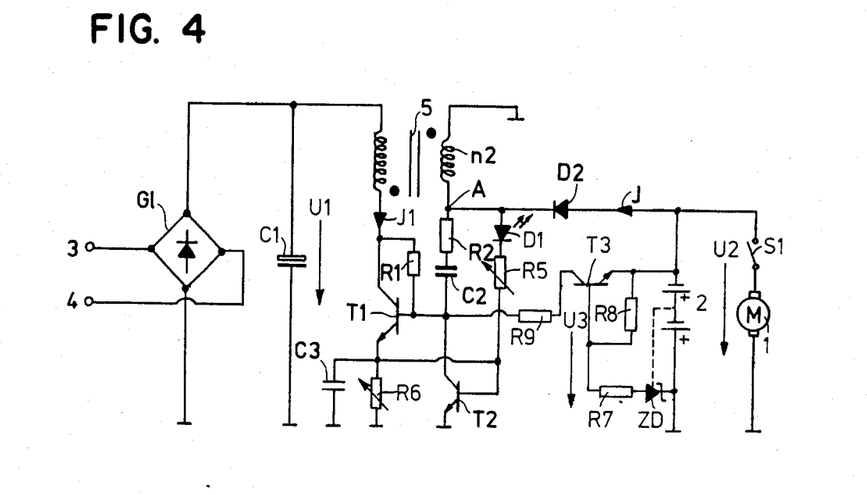
FIG. 4 shows a modification of the embodiment shown in FIG. 1.

FIG. 4 shows a modified embodiment of the circuit arrangement shown in FIG. 1. The actual converter circuit comprising the transistors T1, T2 and the transformer 5, and also the resistors R1, R2, R5 and R6 and the light emitting diode D1 is also unaltered in regard to the function thereof. However, instead of switching over the converter output between charging and motor modes by means of the switch S2 and the resistors R3 and R4, in the case of the circuit arrangement shown in FIG. 4, when the motor 1 is switched off, rapid charging of the battery 2 which again comprises nickel-cadmium cells is effected, with a high current. In that case however, the charging current must be switched off in good time in order to avoid damaging the battery. Switching off of the charging current in this way is effected by a voltage-dependent switch which includes a transistor T3. The base-emitter path of the transistor T3 is connected in series with a resistor R7 and a Zener diode ZD, in parallel with the battery 2. If the voltage U2 thereof exceeds the value which is preset by the Zener diode ZD during the charging operation, the transistor T3 begins to conduct and the voltage U3 at the collector thereof becomes negative.

Figure 5:
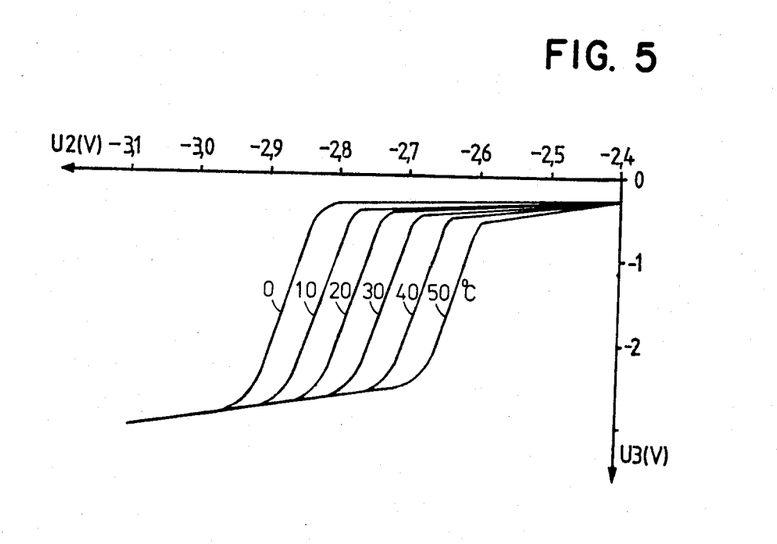
FIG. 5 shows a diagram illustrating the performance of the voltage- and temperature-dependent charging circuit of FIG. 4.

FIG. 5 shows the variation in the collector voltage U3 in dependence on the battery voltage U2, at different temperatures. The resulting temperature coefficient in respect of the voltage U3 is at about 5 mV/°C. and is thus adapted to the temperature range of two series-connected nickel-cadmium cells. In order to detect the temperature of the battery cells in the most possible direct manner, the casing of the Zener diode ZD is thermally connected to the battery, as shown in FIG. 4 in broken lines.

As long as the battery voltage U2 is below the value fixed by the Zener diode ZD, no current flows through the Zener diode and the transistor T3 is in a non-conducting condition. The converter then oscillates and supplies current for rapid charging of the battery 2 and for feeding the motor 1. If the voltage U2 of the battery 2 exceeds a critical value which, taking temperature into account, indicates full charging, a current flows by way of the Zener diode ZD and the resistor R7, which is divided to the base of the transistor T3 and the resistor R8. By virtue of that base current, the transistor T3 is partially switched on, and a current flows from the negative terminal of the battery 2 by way of the resistor R8 to the base of the transistor T1. As soon as the current through the resistor, during the phase in which the transistor T1 is switched on, neutralises the sum of the base current components of the transistor T1, which flow by way of the resistors R1 and R2, the transistor T1 can no longer conduct. The converter ceases to oscillate and a static mode of operation obtains. The base potential of the transistor T1 is now determined by the resistors R1 and R9. The resistor R2 is isolated by the capacitor C2. It is only when the current through the resistor R9 has fallen below the value limited by the resistor R1 that the base potential of the transistor T1 can rise to a value which permits the converter to begin to oscillate again.

As the respective current flowing through the resistor R9, for switching off the converter, predominantly depends on the resistor R2, and the current for switching on depends on the resistor R1, the result is a desired hysteresis performance corresponding to the difference between those currents. Therefore, the converter does not continuously switch back and forth between the switched-on and the switched-off conditions. On the contrary, the voltage U2 of the battery has to fall again by a given amount before the charging current is switched on again. As, when the converter is switched off, the light emitting diode D1 is also extinguished, the battery charging condition of the arrangement can be detected in a simple manner.

Figure 6:
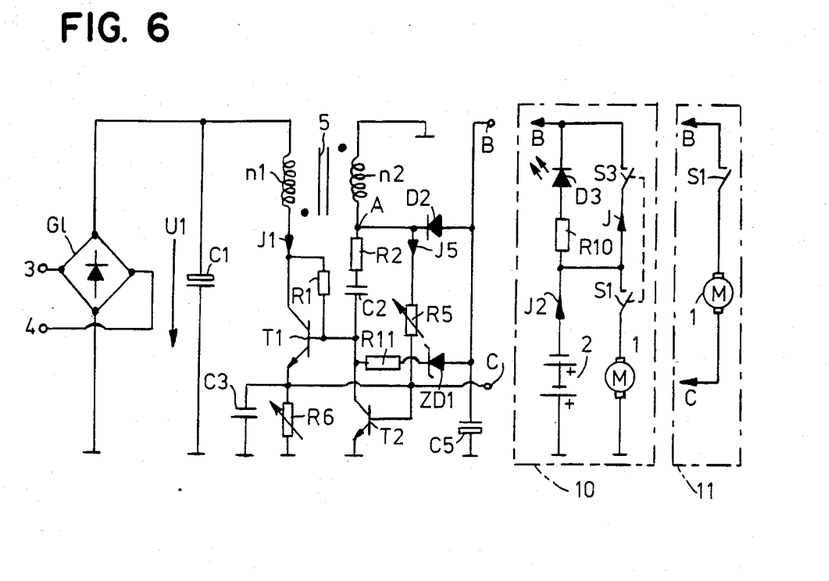
FIG. 6 shows an embodiment in which there is a constant voltage source for supplying the load.

The embodiment shown in FIG. 6 corresponds in principle to the embodiment shown in FIG. 1. It will first be assumed that the circuit 10 which is shown framed with a dash-dotted line is connected to the point B as the load, and that the function of the circuit in the charging mode, that is to say, when the switches S1 and S3 are open, will be considered. As indicated by the broken lines, the two switches S1 and S3 are mechanically interconnected. As soon as the charge voltage of the capacitor C5 exceeds the Zener voltage of the Zener diode ZD1, a current which is restricted by the resistor R11 flows to the base of the transistor T1, which neutralises the starting current R1 and thus holds the transistor T1 in a switched-off condition, as long as the Zener diode ZD1 is active. As soon as the Zener diode ceases to conduct, a starting current can flow into the base of the transistor T1 and thus start the converter. This gives constant voltage control, that is to say, the voltage at the capacitor C5 is held at a value which is determined by the Zener diode ZD1. If readily obtainable Zener diodes with comparatively close tolerances are used, there is only very little scatter or variation in the constant voltage, from one device to another. With a constant voltage, there then flows into the battery a charging current which, with a given battery voltage, is essentially determined by the resistor R10 and which can therefore be easily kept in a desired tolerance range. The light emitting diode D3 which also has the charging current flowing through it indicates the charging mode by being brightly lit.

If the two switches S1 and S3 are closed, with the input voltage U1 applied, the motor starts and the resistor R10 is bridged. This causes the voltage of the capacitor C5 to fall to the voltage level of the battery. As the battery voltage is lower than the Zener breakdown voltage, the Zener diode ZD1 is permanently non-conducting and the output of the converter is no longer restricted. The motor 1 then runs without discharging the battery 2 which now operates only as a voltage stabiliser. In this case, the converter operates as a constant current source. In this operation, the motor current I flows by way of switches S3 and S1 so that both switching contacts are approximately equally loaded and do not show any contact difficulties (because of the self-cleaning action) due to the comparatively high current. It will also be noted that, in the motor mode, the capacitor C5 is disposed directly in parallel with the motor 1 whereby spark interference at the commutator of the motor is suppressed. A further advantage in comparison with the circuit arrangement shown in FIG. 1 is that only a single connecting line is required between the actual converter and the motor portion, including the switches S1 and S3 and the components D3 and R10, instead of three lines as previously, by virtue of the switch S2.

The converter circuit automatically adjusts to the externally set operating parameters, without any intervention for example by means of a switch. The circuit output at the point B is shortcircuit-proof and no-load-proof, in continuous operation. Under no-load conditions, the control action, by way of the Zener diode ZD1, restricts the output power, with the charging voltage of C5 being maintained constant. Under short-circuit conditions, the non-conduction phases of the transistor T1 are increased in length because in that case the core 5 supplies a current for a longer period in each cycle because of the absence of countervoltage. This means that the power produced is restricted to a safe value. As in the case of the circuit arrangement shown in FIG. 1, operation may be on d.c. and a.c. current, at a voltage of between about 90 and 270 V. With suitable dimensioning in respect of R1, the circuit still produces a sufficient charging current even with an input voltage of down to 12 V—so that the battery may be charged up in a motor car or the like, without switching over of the input.

Instead of the circuit 10, the circuit 11 which only includes the motor 1 with switch S1 may be connected to the points B and C. The base point of the motor 1 is then connected to the junction between the resistor R6 and the emitter of the transistor T1, instead of to the common reference potential. In that case, the motor current flows by way of the resistor R6 and in the opposite direction to the currents I1 and I5, as shown by the polarity arrangement of the diode D2. With a rising motor current, that is to say, a heavier loading on the motor, the voltage across the resistor R6 then reaches the value required for producing the switching-off action, at a later time, so that the transistor T1 conducts for a longer period of each cycle, and accordingly a higher level of power is supplied to the motor. This therefore makes it possible to maintain a constant speed of rotation, within certain limits.

Even without the above-described connection of the motor to the resistor R6, a certain adjustment in respect of the motor current is produced by the converter frequency rising in the event of deceleration of the motor and thus a higher level of current consumption. This means at the same time that the effective value of the voltage at the capacitor C5, which is composed of a d.c. voltage and a superimposed a.c. voltage component, becomes slightly higher because of the higher frequency of the alternating current component.

Figure 7:
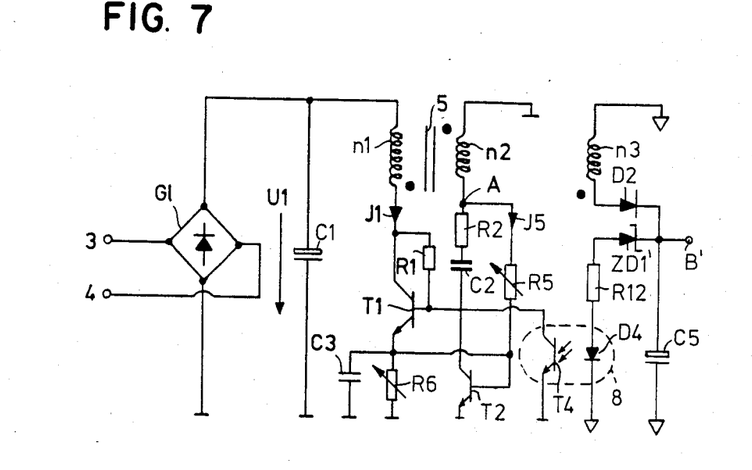
FIG. 7 shows an embodiment similar to that shown in FIG. 6, with additional mains separation.

The embodiment shown in FIG. 7 substantially corresponds to the embodiment shown in FIG. 6. Therefore, components which perform substantially the same function are denoted by the same reference numerals. The FIG. 7 embodiment differs from the embodiment of FIG. 6 in that the output power is produced by a further, separate secondary winding n3, which permits mains separation or isolation. In addition, by suitably arranging the polarity of the diode D2, it is now possible to provide that the capacitor C5 is charged up to a positive voltage relative to the reference point. Apart from the different polarity, the same components as in the embodiment shown in FIG. 6 can be connected to the output terminal B', that is to say, the motor 1, the battery 3 and the associated switching contacts S1, S3, and also the diode D3 and the resistor R10.

Because of the mains separation effect, that is to say, the galvanic separation between the output voltage and the main input voltage at points 3 and 4, in contrast to the circuit arrangement shown in FIG. 6, the Zener diode ZD1' which is used to provide a constant current source does not act directly on the base of the transistor T1, but it is connected in series with the light emitting diode D4 of a photocoupler 8, by way of a resistor R12. The phototransistor T4 of the photocoupler 8 is connected to the base of the transistor T1.

If the charging voltage of the capacitor C5 reaches the Zener breakdown voltage of the Zener diode ZD1', plus the conduction voltage of the light emitting diode D4, the phototransistor T4 becomes conducting and, as in the embodiment shown in FIG. 6, neutralises the starting current for the transistor T1, which flows by way of the resistor R1, so that the converter cannot begin to oscillate.

Figure 9:
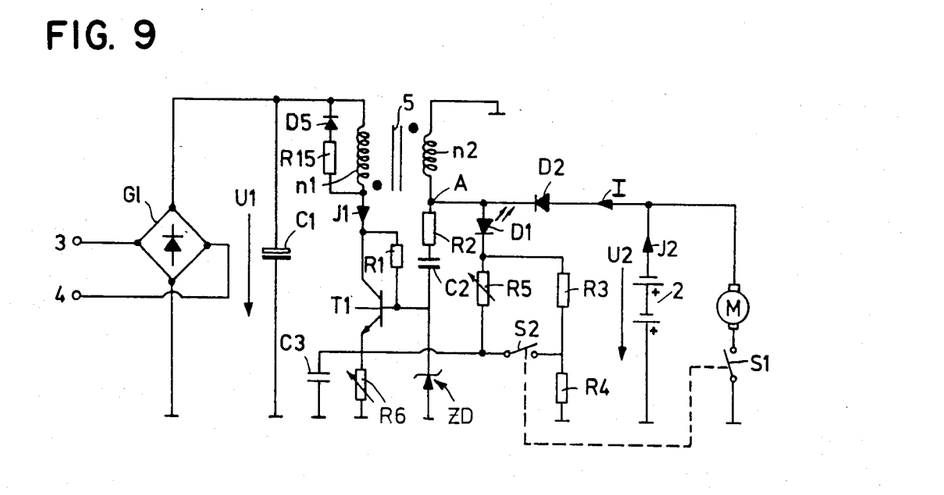
FIG. 9 shows an embodiment similar to that shown in FIG. 1 with a Zener diode substituted for the second semiconductor element.

As described above, in all embodiments, the second semiconductor switch in the form of the transistor T2 may be replaced by a Zener diode which is then connected between the base of the transistor T1 and reference potential. The connection from the emitter of the transistor T1 to the control electrode of the transistor T2 is omitted. If, after the transistor T1 is switched on, the voltage drop across the resistor R6, plus the base-emitter voltage of the transistor T1, reaches the Zener voltage, the primary current flowing by way of the winding n1 cannot rise any further. The resulting reversal of polarity switches the transistor T1 off, because of the feedback by way of the capacitor C2. This therefore also provides a power limiting effect.

The basic design of the circuit arrangement shown in FIG. 8 again corresponds to the above-described arrangements. Therefore, the same circuit components performing the same functions are denoted by the same reference numerals as in the circuit arrangements described hereinbefore.

Figure 8:
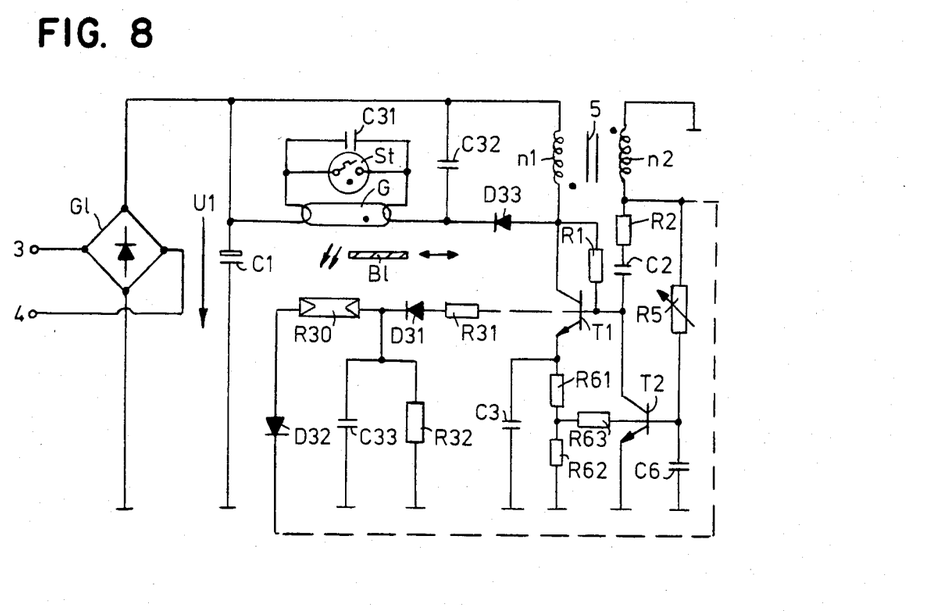
FIG. 8 shows an embodiment for supplying a gas discharge lamp.

The circuit arrangement shown in FIG. 8 supplies a gas discharge lamp in the form of a fluorescent tube G which is connected to the primary winding n1 by way of a diode D33. A starter St with a parallel-connected capacitor C31 is disposed in parallel with the fluorescent lamp in the usual manner, for starting the discharge. Instead of being connected to the primary winding n1, the lamp could also be connected to a separate winding, for example when mains separation is desired. The capacitor C32 which is charged up to a higher voltage before firing improves the firing performance.

As in the case of the above-described circuit arrangements, energy is stored in the transformer core 5 during the conduction phase, and that energy then flows into the fluorescent lamp G by way of the diode D33 once the lamp has been fired. Because, as in the above-described embodiments, the transformer core always stores the same amount of energy, on a time average, the arrangement provides a light flux which is substantially independent of the input voltage. In addition, the volume may be reduced in comparison with conventional series devices for fluorescent lamps, in the form of a choke, and an enhanced level of efficiency may be achieved, with lower losses.

Unlike the embodiments described hereinbefore, in the circuit arrangement shown in FIG. 8 the emitter resistor of the transistor T1 is divided into two series-connected resistors R61 and R62. The current which is supplied to the emitter resistor and which is proportional to the input voltage and which flows by way of the resistor R5 is taken to the junction between the resistors R61 and R62 by way of a further limiting resistor R63. The base of the transistor T2 is now connected to the junction of the resistors R5 and R63. This alternative form of the circuitry, which can also be used in the above-described circuit arrangements, makes it possible to achieve improved performance in respect of switching off the transistor T1, and a reduction in the control losses, in particular in the resistor R5, because that resistor can be substantially larger than in the other embodiments. The capacitor C6 which is connected to the base of the transistor T2 prevents a tendency to oscillation when the transistor T1 is switched off.

The circuit shown in FIG. 8 also includes a brightness control means for the fluorescent lamp G. In the non-conduction phase of the transformer 5, a voltage is taken from the winding n2 by way of the connecting line shown in broken lines, and a diode D32 of suitable polarity arrangement. That voltage charges a capacitor C33 with a discharging resistor R32 in parallel therewith, up to a voltage which is negative in relation to earth, by way of a photoresistor R30. By way of the diode D31 and the resistor R31, the negative voltage causes the transistor T1 to be non-conducting for a given period of time so that the light intensity of the fluorescent lamp G can be controlled by the above-described manner of influencing the non-conduction period. A control action is achieved by a part of the light of the lamp G falling on to the photoresistor R30, by way of a mechanically adjustable shutter member B1, whereby the light strength as adjusted by means of the shutter member B1 is maintained at a constant level.

The foregoing detailed description has been given for clearness of understanding only and no unnecessary limitations should be understood therefrom as some modifications will be obvious to those skilled in the art.

I claim:

1. A circuit arrangement for the controlled supply of a load, from input voltage sources of different voltages, using a blocking converter comprising a transformer (5), the primary winding (n1) of which is connected to the input voltage source by way of a first controllable semiconductor switch (T1) and which supplies the load by way of one of its windings (n2), and a second controllable semiconductor switch (T2) having a control electrode to which there is applied a control signal which is proportional to the primary current (I1) flowing through the primary winding so that the second semiconductor switch produces switching-off of the first semiconductor switch and thus makes the period for which the first semiconductor switch is switched on dependent on the primary current, characterised in that a second control signal which is proportional to the voltage (U1) of the input voltage source (3, 4) is additionally applied to the control electrode of the second semiconductor switch (T2).

2. A circuit arrangement as set forth in claim 1 further comprising a first resistor (R6) connected in series with the primary winding (n1) of the transformer (5) wherein a current component which is proportional to the voltage (U1) of the input voltage source (3, 4) is superimposed (by way of R5) on the primary current (I1) flowing through the first resistor (R6), and wherein the voltage drop at the first resistor (R6) is applied to act as the first and second control signals to the control electrode of the second semiconductor switch (T2).

3. A circuit arrangement as set forth in claim 2 wherein said current component proportional to the voltage (U1) of the input voltage source (3, 4) is supplied from a secondary winding (n2) of the transformer (5).

4. A circuit arrangement as set forth in claim 3 wherein said current component proportional to the voltage (U1) of the input voltage source (3, 4) is limited by a second resistor (R5).

5. A circuit arrangement as set forth in claim 4 characterized in that a display means (D1), is connected in series with the second resistor (R5).

6. A circuit arrangement as set forth in claim 4 characterised in that the first resistor (R6) and the second resistor (R5) are variable (FIG. 1).

7. A circuit arrangement as set forth in claim 1 characterised in that the winding (n2) which supplies the load has a rectifier (D2) connected downstream thereof, and that the load includes an accumulator (2) such that the period ($t_s$) for which the first semiconductor switch (T1) is switched off is determined by the approximately constant voltage (U2) of said accumulator and a predetermined mean output current (I2) flows into the load (FIG. 1).

8. A circuit arrangement as set forth in claim 7 characterised in that the load comprises said accumulator (2) and a motor (1) having an actuating switch (S1), and that there is coupled to said switch (S1) a second switch (S2) which, when said motor is switched on, varies the first and second resistors (R6; R5) in such a way that said converter supplies a current sufficient to drive said motor (FIG. 1).

* * * * *

UNITED STATES PATENT AND TRADEMARK OFFICE
CERTIFICATE OF CORRECTION

PATENT NO. : 4,504,775
DATED : March 12, 1985
INVENTOR(S) : Klaus Becker

It is certified that error appears in the above-identified patent and that said Letters Patent is hereby corrected as shown below:

Column 14, line 59 delete "I claim" insert --What is claimed is--

Signed and Sealed this

Thirteenth Day of August 1985

[SEAL]

Attest:

DONALD J. QUIGG

*Attesting Officer*　　*Acting Commissioner of Patents and Trademarks*